United States Patent
Shal et al.

(10) Patent No.: US 7,826,947 B2
(45) Date of Patent: Nov. 2, 2010

(54) METHOD FOR ESTABLISHING A RATE LIMIT ON THE DAMPER COMMAND SIGNAL OF A VEHICLE DAMPER

(76) Inventors: David A. Shal, 1222 Ravelle Ct., Bellbrook, OH (US) 45305; Robin Oakley, 48 rue de la Tuilerie, Trumilly, 60800 (FR)

(*) Notice: Subject to any disclaimer, the term of this patent is extended or adjusted under 35 U.S.C. 154(b) by 983 days.

(21) Appl. No.: 11/643,732

(22) Filed: Dec. 21, 2006

(65) Prior Publication Data

US 2007/0173996 A1   Jul. 26, 2007

Related U.S. Application Data

(60) Provisional application No. 60/758,811, filed on Jan. 13, 2006.

(51) Int. Cl.
 *B60G 17/00* (2006.01)
(52) U.S. Cl. ...................................................... 701/37
(58) Field of Classification Search .................. 701/37, 701/38, 48, 91; 280/5.502–5.515
See application file for complete search history.

(56) References Cited

U.S. PATENT DOCUMENTS 6,633,803 B1 * 10/2003 Shal et al. ...................... 701/37
7,286,919 B2 * 10/2007 Nordgren et al. .............. 701/37

* cited by examiner

*Primary Examiner*—Kim T Nguyen
(74) *Attorney, Agent, or Firm*—Dickinson Wright PLLC

(57) ABSTRACT

A first method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived at least from an algorithm for vehicle body control. The first method includes steps a) through c). Step a) includes identifying a noise indicating signal predictive of noise occurring in the vehicle due to operation of the damper, wherein the noise indicating signal is derived from the algorithm. Step b) includes calculating the noise indicating signal. Step c) includes determining the limit based at least on the calculated noise indicating signal.

12 Claims, 2 Drawing Sheets

METHOD FOR ESTABLISHING A RATE LIMIT ON THE DAMPER COMMAND SIGNAL OF A VEHICLE DAMPER

CROSS REFERENCE TO RELATED APPLICATIONS

The present application claims priority of U.S. Provisional Application No. 60/758,811 filed Jan. 13, 2006, the entire disclosure of which is incorporated herein by reference.

TECHNICAL FIELD

The present invention relates generally to vehicle dampers having damping characteristics wherein a change in the damper command signal changes the damping characteristics, and more particularly to a method for determining a limit on the time rate of change of such damper command signal.

BACKGROUND OF THE INVENTION

Known dampers include those dampers, such as magnetorheological (MR) dampers, electrorheological (ER) dampers, and valve dampers, whose damping characteristics change with a change in a damper command signal applied to the damper by a controller. In one example, a change in the electric current applied to the coil of an MR damper changes the damping characteristics of the MR fluid contained in the MR damper. Conventional applications of dampers include a damper associated with a wheel of a vehicle. Known algorithms for calculating a damper command signal include those algorithms which take into account body control, wheel control, stability control, and energy management. Known body control includes body control based at least on a skyhook method which includes a first input which is a body absolute velocity and includes a second input which is a body-to-wheel relative velocity. The two velocities are referred to as vertical velocities in the skyhook method. Known body control includes limiting the time rate of change of the damper command signal at a transition time between when the two velocities have a same sign and when the two velocities have opposite signs to reduce or avoid noise occurring in the vehicle if the damper command signal were not limited at the transition time.

What is needed is an improved method for establishing a limit on the time rate of change of the damper command signal of a vehicle damper.

SUMMARY OF THE INVENTION

A first method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived at least from an algorithm for vehicle body control. The first method includes steps a) through c). Step a) includes identifying a noise indicating signal predictive of noise occurring in the vehicle due to operation of the damper, wherein the noise indicating signal is derived from the algorithm. Step b) includes calculating the noise indicating signal. Step c) includes determining the limit based at least on the calculated noise indicating signal. In one enablement of the first method, steps b) and c) are substantially continuously performed whenever the damper command signal is applied to the damper. In one example, the algorithm at least employs a skyhook method for vehicle body control.

Several benefits and advantages are derived from the first method of the invention. In one example, the damper command signal, which provides a comfortable ride for occupants of the vehicle, has its time rate of change limited to reduce or avoid noise for occupants of the vehicle due to operation of the damper when such noise is predicted to occur.

DESCRIPTION OF THE PREFERRED EMBODIMENT

Figure 1:
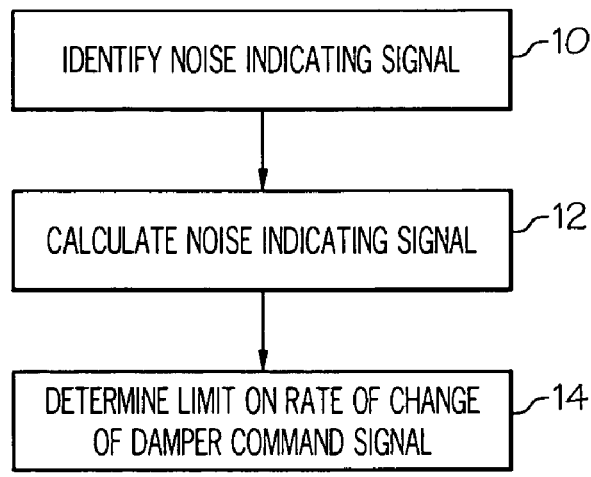
FIG. 1 is a flow chart of a first method of the invention.
Figure 3:
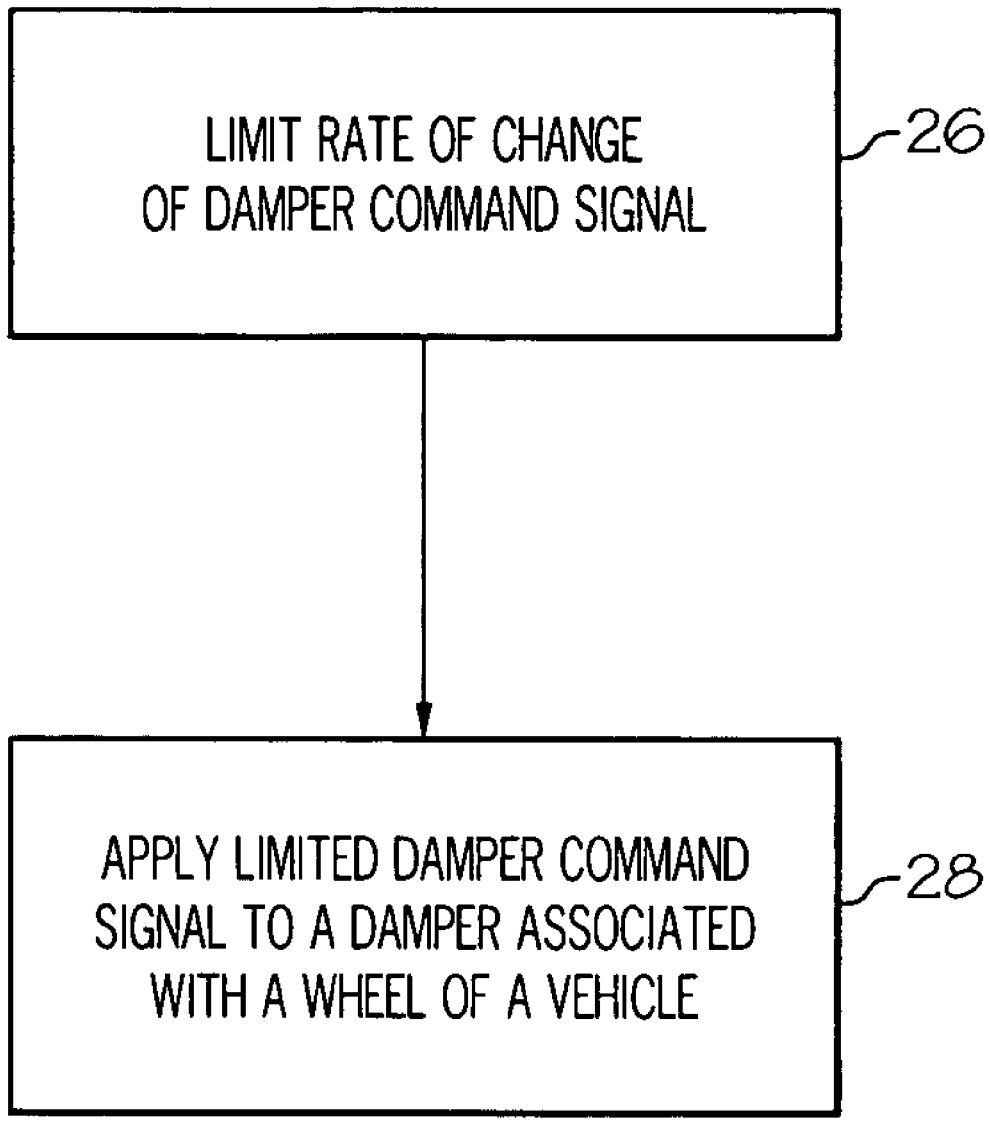
FIG. 3 is a flow chart of two additional steps applicable to the first method of FIG. 1 and the second method of FIG. 2.

A first method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived at least from an algorithm for vehicle body control. The first method includes steps a) through c). Step a) is labeled as "Identify Noise Indicating Signal" in block 10 of FIG. 1. Step a) includes identifying a noise indicating signal predictive of noise occurring in the vehicle due to operation of the damper, wherein the noise indicating signal is derived from the algorithm. Step b) is labeled as "Calculate Noise Indicating Signal" in block 12 of FIG. 1. Step b) includes calculating the noise indicating signal. Step c) is labeled as "Determine Limit On Rate Of Change Of Damper Command Signal" in block 14 of FIG. 1. Step c) includes determining the limit based at least on the calculated noise indicating signal. The first method further includes steps d) and e) which inherently follow from steps a) through c). Step d) is labeled as "Limit Rate Of Change Of Damper Command Signal" in block 26 of FIG. 3. Step d) includes limiting the time rate of change of the damper command signal as determined by step c). Step e) is labeled as "Apply Limited Damper Command Signal To A Damper Associated With A Wheel Of A Vehicle" in block 28 of FIG. 3. Step e) includes applying the damper command signal to the damper as limited by step d).

In a first example of the first method, the algorithm at least employs a skyhook method for vehicle body control. In a second example of the first method, the algorithm at least employs a yaw control method for vehicle body control, wherein the yaw control method is tuned with different gains in compression and rebound of the damper. Other examples of algorithms for vehicle body control, wherein the control is generally out of phase with wheel motion but is modified by separate gains in compression and rebound of the damper, are left to the artisan.

In one enablement of the first method, steps b) and c) are substantially continuously performed whenever the damper command signal is applied to the damper.

It is noted that the well-known skyhook method for vehicle body control and other well-known methods for vehicle body control include at least a first input which is a body absolute velocity and a second input which is a body-to-wheel relative velocity and such methods derive an unlimited body demand force. Modified skyhook methods for vehicle body control and other modified methods for vehicle body control are also well known to those skilled in the art. Such modifications to the skyhook method and to the other methods include deriving a limited body demand force and include, for example, demand force smoothing, applying hysteresis to a transition time between when the two velocities have a same sign and when the two velocities have opposite signs, limiting the time rate of change of the damper command signal at such transition time, and adjusting PWM (pulse width modulation) mapping points when PWM is employed to deliver the damper command signal to the damper. Known algorithms based at least on the skyhook method for vehicle body control include those algorithms which also take into account, for example, wheel control, stability control, and energy management.

In one embodiment of the first method, the damper is a shock absorber of a four-wheeled passenger car wherein one end of the damper is operatively connected to the sprung mass of the vehicle (also referred to as the vehicle body) and the other end of the damper is operatively connected to the unsprung mass of the vehicle (also referred to as a wheel). In this embodiment, the passenger car would have four dampers (one associated with each wheel), wherein each damper would receive its own separately calculated damper command signal.

In one application of the first method, the limit corresponding to a particular value of the noise indicating signal is different when the noise indicating signal is increasing with time than when the noise indicating signal is decreasing with time. In one illustration of the first method, the damper is a magnetorheological damper.

In a first implementation of the first method, the noise indicating signal is obtained from filtering the absolute value of a difference between an unlimited body demand force derived from the algorithm and a limited body demand force derived from the algorithm, and the filtering passes at least one target noise detection frequency predictive of the noise. In one example, the wheel resonates at substantially ten Hertz, and the at least one target noise detection frequency is twenty Hertz.

In a second implementation of the first method, the noise indicating signal is obtained from filtering the absolute value of a ratio whose numerator is a difference between an unlimited body demand force derived from the algorithm and a limited body demand force derived from the algorithm and whose denominator is the unlimited body demand force derived from the algorithm, and the filtering passes at least one target noise detection frequency predictive of the noise. In one example, the wheel resonates at substantially ten Hertz, and the at least one target noise detection frequency is twenty Hertz.

In a third implementation of the first method, the noise indicating signal is obtained from filtering the absolute value of the damper command signal, and wherein the filtering passes at least one target noise detection frequency predictive of the noise. In one example, the wheel resonates at substantially ten Hertz, and the at least one target noise detection frequency is twenty Hertz. It is noted that the first method is not limited to the above-described types of noise indicating signals.

In the above-described implementations, the larger the noise indicating signal, the more likely the noise will occur. In one employment of the first method, values of the noise indicating signal which predict noise occurring in the vehicle due to operation of the damper, and corresponding values of limits on the time rate of change of the damper command signal which reduce or avoid such noise, are experimentally determined, as is within the level of skill of the artisan.

Figure 2:
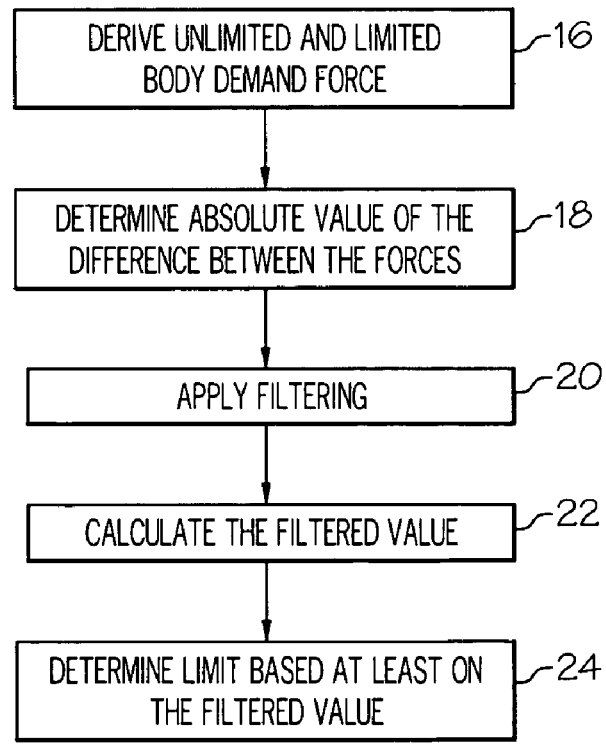
FIG. 2 is a flow chart of a second method of the invention.

A second method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived from an algorithm which at least employs a skyhook method for vehicle body control. The second method includes steps a) through e). Step a) is labeled as "Derive Unlimited And Limited Body Demand Force" in block 16 of FIG. 2. Step a) includes deriving from the algorithm an unlimited body demand force and a limited body demand force. Step b) is labeled as "Determine Absolute Value Of The Difference Between The Forces" in block 18 of FIG. 2. Step b) includes determining an absolute value of a difference between the unlimited body demand force and the limited body demand force. Step c) is labeled as "Apply Filtering" in block 20 of FIG. 2. Step c) includes filtering the absolute value of the difference, wherein the filtering passes at least one target noise detection frequency predictive of the noise. Step d) is labeled as "Calculate The Filtered Value" in block 22 of FIG. 2. Step d) includes calculating the filtered absolute value of the difference. Step e) is labeled as "Determine Limit Based At Least On The Filtered Value" in block 24 of FIG. 2. Step e) includes determining the limit based at least on the calculated filtered absolute value of the difference. The second method further includes steps f) and g) which inherently follow from steps a) through e). Step f) corresponds to block 26 of FIG. 3. Step f) includes limiting the time rate of change of the damper command signal as determined by step e). Step g) corresponds to block 28 of FIG. 3. Step g) includes applying the damper command signal to the damper as limited by step f).

In one enablement of the second method, steps b) through e) are substantially continuously performed whenever the damper command signal is applied to the damper. In one application of the second method, the limit corresponding to a particular value of the noise indicating signal is different when the noise indicating signal is increasing with time than when the noise indicating signal is decreasing with time. In one illustration of the second method, the damper is a magnetorheological damper.

In a first implementation of the second method, step c) uses a band pass filter to pass the at-least one target noise detection frequency. In one variation, after using the band pass filter, step c) uses a differential low pass filter, wherein the differential low pass filter uses different coefficients when the band-pass-filtered absolute value of the difference is increasing than when the band-pass-filtered absolute value of the difference is decreasing, and wherein the low pass filter passes frequencies which are lower than the band pass filter. In one modification, step e) uses a two-point look-up table and interpolates between the two points. In one example, the look-up table has discrete values of the noise indicating signal paired with discrete values of the limit on the time rate of change of the damper command signal to reduce or avoid noise based on the corresponding value of the paired noise indicating signal. If the actual noise indicating signal is between two discrete noise indicating signal values, interpolation is used to calculate the limit.

In a second implementation of the second method, step c) uses a high pass filter to pass the at-least one target noise detection frequency. In one variation, after using the high pass filter, step c) uses a differential low pass filter, wherein the differential low pass filter uses different coefficients when the high-pass-filtered absolute value of the difference is increasing than when the high-pass-filtered absolute value of the difference is decreasing and wherein the low pass filter passes frequencies which are lower than the high pass filter. In one modification, step e) uses a two-point look-up table and interpolates between the two points.

A third method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived from an algorithm which at least employs a skyhook method for vehicle body control. The third method includes steps a) through e). Step a) includes deriving from the algorithm an unlimited body demand force and a limited body demand force. Step b) includes determining an absolute value of a ratio whose numerator is a difference between the unlimited body demand force and the limited body demand force and whose denominator is the unlimited body demand force. Step c) includes filtering the absolute value of the ratio, wherein the filtering passes at least one target noise detection frequency predictive of the noise. Step d) includes calculating the filtered absolute value of the ratio. Step e) includes determining the limit based at least on the calculated filtered absolute value of the ratio. The third method further includes steps f) and g) which inherently follow from steps a) through e). Step f) includes limiting the time rate of change of the damper command signal as determined by step e). Step g) includes applying the damper command signal to the damper as limited by step f).

The enablements, applications, illustrations, implementations, etc. of the second method are equally applicable to the third method.

A fourth method of the invention is for establishing a limit on the time rate of change of a damper command signal applied to a damper associated with a wheel of a vehicle, wherein the damper has damping characteristics, wherein a change in the damper command signal changes the damping characteristics, and wherein the damper command signal is derived from an algorithm which at least employs a skyhook method for vehicle body control. The fourth method includes steps a) through e). Step a) includes deriving from the algorithm a damper command signal. Step b) includes determining an absolute value of the damper command signal. Step c) includes filtering the absolute value of the damper command signal, wherein the filtering passes at least one target noise detection frequency predictive of the noise. Step d) includes calculating the filtered absolute value of the damper command signal. Step e) includes determining the limit based at least on the calculated filtered absolute value of the damper command signal. The fourth method further includes steps f) and g) which inherently follow from steps a) through e). Step f) includes limiting the time rate of change of the damper command signal as determined by step e). Step g) includes applying the damper command signal to the damper as limited by step f).

The enablements, applications, illustrations, implementations, etc. of the second method are equally applicable to the fourth method.

Several benefits and advantages are derived from the first, second, third, and/or fourth methods of the invention. In one example, the damper command signal, which provides a comfortable ride for occupants of the vehicle, has its time rate of change limited to reduce or avoid noise for occupants of the vehicle due to operation of the damper when such noise is predicted to occur.

The foregoing description of several methods of the invention has been presented for purposes of illustration. It is not intended to be exhaustive or to limit the invention to the precise form or steps disclosed, and obviously many modifications and variations are possible in light of the above teaching. It is intended that the scope of the invention be defined by the claims appended hereto.

The invention claimed is:

1. A method for establishing a time limit on the time rate of change of a damper command signal applied to a damper associated with a wheel of a vehicle, wherein the damper has damping characteristics, wherein a change in the damper command signal changes the damping characteristics, wherein the damper command signal is derived at least from an algorithm for vehicle body control, and wherein the method comprises the steps of:
    (a) identifying a noise indicating signal predictive of noise occurring in the vehicle due to operation of the damper, wherein the noise indicating signal is derived from the algorithm and is obtained from filtering the absolute value of a ratio whose numerator is a difference between unlimited body demand force derived from the algorithm and a limited body demand force derived from the algorithm and whose denominator is the unlimited body demand force derived from the algorithm, and wherein the filtering passes at least one target noise detection frequency predictive of the noise;
    (b) calculating the noise indicating signal;
    (c) determining the limit based at least on the calculated noise indicating signal;
    (d) limiting the time rate of change of the damper command signal as determined by step (c); and
    (e) applying the damper command signal to the damper as limited by step (d).

2. The method of claim 1, wherein steps b) and c) are substantially continuously performed whenever the damper command signal is applied to the damper.

3. The method of claim 1, wherein the limit corresponding to a particular value of the noise indicating signal is different when the noise indicating signal is increasing with time than when the noise indicating signal is decreasing with time.

4. The method of claim 1, wherein the damper is a magnetorheological damper.

5. The method of claim 1, wherein the noise indicating signal is obtained from filtering the absolute value of a difference between an unlimited body demand force derived from the algorithm and a limited body demand force derived from the algorithm, and wherein the filtering passes at least one target noise detection frequency predictive of the noise.

6. The method of claim 1, wherein the noise indicating signal is obtained from filtering the absolute value of the damper command signal, and wherein the filtering passes at least one target noise detection frequency predictive of the noise.

7. A method for establishing a limit on the time rate of change of a damper command signal applied to a damper associated with a wheel of a vehicle, wherein the damper has damping characteristics, wherein a change in the damper command signal changes the damping characteristics, wherein the damper command signal is derived from an algorithm which at least employs a skyhook method for vehicle body control, and wherein the method comprises the steps of:
    a) deriving from the algorithm an unlimited body demand force and a limited body demand force;
    b) determining an absolute value of a ratio whose numerator is a difference between the unlimited body demand force and the limited body demand force and whose denominator is the unlimited body demand force;

c) filtering the absolute value of the ratio, wherein the filtering passes at least one target noise detection frequency predictive of the noise;

d) calculating the filtered absolute value of the ratio;

e) determining the limit based at least on the calculated filtered absolute value of the ratio;

f) limiting the time rate of change of the damper command signal as determined by step e); and g) applying the damper command signal to the damper as limited by step f).

8. The method of claim 7, steps b) through e) are substantially continuously performed whenever the damper command signal is applied to the damper.

9. The method of claim 8, wherein step c) uses a band pass filter to pass the at-least one target noise detection frequency.

10. The method of claim 9, wherein, after using the band pass filter, step c) uses a differential low pass filter, wherein the differential low pass filter uses different coefficients when the band-pass-filtered absolute value of the ratio is increasing than when the band-pass-filtered absolute value of the ratio is decreasing, and wherein the low pass filter passes frequencies which are lower than the band pass filter.

11. The method of claim 10, wherein step e) uses a two-point look-up table and interpolates between the two points.

12. The method of claim 11, wherein the damper is a magnetorheological damper.

* * * * *

UNITED STATES PATENT AND TRADEMARK OFFICE
CERTIFICATE OF CORRECTION

| | | |
|---|---|---|
| PATENT NO. | : 7,826,947 B2 | Page 1 of 1 |
| APPLICATION NO. | : 11/643732 | |
| DATED | : November 2, 2010 | |
| INVENTOR(S) | : David A. Shal and Robin Oakley | |

It is certified that error appears in the above-identified patent and that said Letters Patent is hereby corrected as shown below:

Column 6, Claim 1, Lines 19-20 "difference between unlimited body" should read -- difference between an unlimited body --

Signed and Sealed this
Twenty-second Day of February, 2011

David J. Kappos
*Director of the United States Patent and Trademark Office*